United States Patent
Van Den Broek et al.

(10) Patent No.: US 8,626,398 B2
(45) Date of Patent: Jan. 7, 2014

(54) COLLISION AVOIDANCE SYSTEM AND METHOD FOR A ROAD VEHICLE AND RESPECTIVE COMPUTER PROGRAM PRODUCT

(75) Inventors: Thijs Hendrikus Adrianus Van Den Broek, Eindhoven (NL); Jeroen Ploeg, Helmond (NL)

(73) Assignee: Nederlandse Organisatie voor toegepast-natuurwetenschappelijk Onderzoek TNO (NL)

( * ) Notice: Subject to any disclaimer, the term of this patent is extended or adjusted under 35 U.S.C. 154(b) by 0 days.

(21) Appl. No.: 13/500,093

(22) PCT Filed: Oct. 5, 2010

(86) PCT No.: PCT/NL2010/050651
§ 371 (c)(1), (2), (4) Date: Jun. 12, 2012

(87) PCT Pub. No.: WO2011/043658
PCT Pub. Date: Apr. 14, 2011

(65) Prior Publication Data
US 2012/0271518 A1    Oct. 25, 2012

(30) Foreign Application Priority Data
Oct. 5, 2009  (EP) ..................... 09172241

(51) Int. Cl.
*G08G 1/16* (2006.01)
(52) U.S. Cl.
USPC ............................................ 701/48; 701/301
(58) Field of Classification Search
USPC ................................................... 701/48, 301
See application file for complete search history.

(56) References Cited

U.S. PATENT DOCUMENTS

| 2003/0055563 A1 | 3/2003 | Lars et al. |
| 2004/0024527 A1 | 2/2004 | Patera |

(Continued)

FOREIGN PATENT DOCUMENTS

| EP | 0464821 A1 | 1/1992 |
| EP | 1865479 A1 | 12/2007 |

(Continued)

OTHER PUBLICATIONS

PCT/NL2010/050651 International Search Report dated Feb. 1, 2011.

(Continued)

*Primary Examiner* — Mary Cheung
*Assistant Examiner* — Yuen Wong
(74) *Attorney, Agent, or Firm* — Banner & Witcoff, Ltd.

(57) ABSTRACT

Collision avoidance actions in a road vehicle are controlled based on a computed probability density of future positions of the vehicle. A preliminary probability density (32) is computed by means of a mechanical model by extrapolation from the detected state of the vehicle, including at least its detected position (31). Map data is used to define different regions in an area that contains the road, such as a first region that comprises a road part for traffic that moves in the direction of travel of the vehicle, a second region that comprises a road part for traffic in the opposite direction and a third region bordering on the road. The regions are used to obtain a correction factor of the computed probability density function in the first region (33). The correction factor is computed dependent on the aggregates of the probability density function in respective ones of the regions. In this way it is possible to compensate for errors that result from extrapolations that misinterpret swerving motion that suggest that the vehicle will move of the road, but are automatically corrected by the driver.

12 Claims, 2 Drawing Sheets

(56) References Cited

U.S. PATENT DOCUMENTS

| | | |
|---|---|---|
| 2004/0024528 A1 | 2/2004 | Patera et al. |
| 2005/0280520 A1 | 12/2005 | Kubo |
| 2006/0031015 A1 | 2/2006 | Paradie |
| 2007/0131801 A1 | 6/2007 | Hedger |
| 2007/0286475 A1 | 12/2007 | Sekiguchi |
| 2009/0204289 A1* | 8/2009 | Lehre et al. ............ 701/36 |

FOREIGN PATENT DOCUMENTS

| | | |
|---|---|---|
| EP | 2093741 A1 * | 8/2009 |
| JP | 2009064088 A | 3/2009 |
| WO | 2008/103048 A1 | 8/2008 |

OTHER PUBLICATIONS

Barios. C.; Himberg. H.; Motai. Y; Sadek.: "Multiple Model Framework of Adaptive Extended Kalman Filtering for Predicting Vehicle Location". Proceedings of the 2006 IEEE Intelligent Transportation Systems Conference. Toronto, Canada. Sep. 17-20, 2006. pp. 1053-1059. XP0007911746.

Karlsson R et al: "Model-based statistical tracking and decision making for collision avoidance application". American Control Conference. 2004. Proceedings of the 2004 Boston. MA. USA Jun. 30-Jul. 2, 2004. Piscataway, NJ. USA. IEEE. vol. 4. Jun. 30, 2004. pp. 3435-3440. XP010761611. ISBN: 978-0-7803-8335-7.

Jansson J et al: "A framework and automotive application of collision avoidance decision making". Sep. 1, 2008. Automatica. Pergamon. pp. 2347-2351. XP02430822. ISSN: 0005-1098 [retrieved on Mar. 21, 2008].

Markus Bohning et al, "Situation Analysis for Automotive Pre-Crash Systems" (Proc. of SPIE, vol. 6937,2007).

Taewung Kim et al, "A Simple Vehicle Model for Path Prediction During Evasive Maneuvers and a Stochastic Analysis on the Crash Probability" (Proc. of IMECE2007, pp. 267-275, 2007).

Lee Yang et al, "A Real-Time Monte Carlo Implementation for Computing Probability of Conflict" (AIAA Guidance, Navigation and Control Conference and Exhibit, 2004).

Henning Ritter et al, "Radar-Based Situation Analysis for Automotive Applications" (WIT 2008—5th International Workshop on Intelligent Transportation, pp. 43-48, 2008).

* cited by examiner

COLLISION AVOIDANCE SYSTEM AND METHOD FOR A ROAD VEHICLE AND RESPECTIVE COMPUTER PROGRAM PRODUCT

CROSS-REFERENCE TO RELATED APPLICATIONS

This application is a U.S. National Stage application under 35 U.S.C. §371 of International Application PCT/NL2010/050651 (published as WO 2011/043658 A1), filed Oct. 5, 2010, which claims priority to Application EP 09172241.3, filed Oct. 5, 2009. Benefit of the filing date of each of these prior applications is hereby claimed. Each of these prior applications is hereby incorporated by reference in its entirety.

FIELD OF THE INVENTION

The invention relates to a collision avoidance system for a road vehicle such as a motor car and a method of collision avoidance.

BACKGROUND

US2003/55563 describes a method of collision avoidance which involves the prediction of time dependent probability densities for the position of a vehicle and another road user. The observed current position and velocity and a probability distribution of the acceleration are used to compute probability densities for future positions. From the probability densities a probability is calculated that the vehicle will be at a same place at a same time as the other road user. Based on this probability an action is triggered, such as the generation of an alarm signal to the driver or automatic breaking.

Use of probability density function for collision avoidance is also described in a number of articles by J. Jansson et al., for example in an article titled "A framework and automotive application of collision avoidance decision making" in Automatica 2008, pages 2347-2351 or "Model based statistical tracking and decision making for collision avoidance application" in the proceedings of the 2004 American Control Conference pages 3435-3440.

US2003/55563 represents the probability density as a normal distribution for values of a state vector that includes the two dimensional coordinates of the position of the vehicle, and by computing the parameters of the normal distribution, i.e. state vector average and covariance, as a function of time. The state vector includes components representing the two-dimensional coordinates of a vehicle, its two-dimensional velocity and its rate of direction change. An extended Kalman filter is used to compute the parameters of the normal distribution.

The accuracy decreases when the time scale at which collision avoidance is considered becomes larger. The effectivity of this kind of collision avoidance is strongly dependent on the accuracy of the probability density. If the probability density for certain locations is overestimated this can give rise to false alarms, which will compromise the reliance on justified alarms. On the other hand failure to generate an alarm may occur, if the probability density for certain locations is underestimated.

Known collision avoidance only uses a mechanical model of vehicle motion to predict the probability density function. These models ignore the effect of driver behaviour and aspects of road construction, such as the presence of a guard rail. A guard rail may define bounds on the spatial distribution of the probability density, but it may affect the real probability density function in other ways as well. On a short time scale, at which driver behaviour has little effect, and a slightly longer time scale at which a driver is not expected to make any changes mechanical modelling may be accurate. But on much longer time scales, the probability density cannot be estimated at all because it depends strongly on mechanically unpredictable driver behaviour.

Conventionally, probability density is used only at time scales, at which inaccuracy due to aspects of road construction and driver behaviour can be neglected. On this case the mechanical model suffices. At longer time scales the predictions of probability density are considered to be so randomly inaccurate that no use can be made of then for collision protection. However, it has been found that the failure to account for driver behaviour may also give rise to systematic false alarms or failures to give alarm. For example, a vehicle normally swerves slightly on the road. When vehicle direction at an instant during such swerving motion is extrapolated mechanically, it may give rise to false alarm, because the mechanical extrapolation neglects the fact that the driver will almost unknowingly change the swerving motion long before the vehicle leaves its lane, or a guard rail will prevent this.

A realistic determination of the probability density would be desirable that reduces these kinds of errors. However, as this involves accounting for driver behaviour and road construction no simple mechanical models are available to do so.

SUMMARY

Among others it is an object to provide for an improved collision avoidance system, wherein a more accurate probability density is provided.

A collision avoidance system according to claim 1 is provided. Herein a preliminary probability density of future positions of a vehicle is predicted with a computation that uses a detected initial state including position of the vehicle. The predicted preliminary probability density function may be based on vehicle dynamics. This predicted preliminary probability density function is corrected by means of a factor that applies to a selected region of an area that contains the road. A correction factor is computed that is applicable to all positions in the selected region, dependent on aggregates of the preliminary probability density function in at least part of said regions.

In one example, this makes it possible to compensate for errors that result from extrapolations that misinterpret unconscious swerving motion, for example. The first one of the regions may comprise a portion of the road for driving in the direction of travel of the vehicle, as defined by map data. The correction factor modifies the distribution of the preliminary probability density over different regions in favour of said first region. The preliminary probability density in this first region may be underestimated due to extrapolation of swerving motion that in reality will be corrected by the driver. The correction factor provides a means for correcting this. This may be done for example by making the correction factor increasingly larger as the aggregate of the preliminary probability density that the predicted probability density function associates with the first region becomes smaller or, equivalently, when the aggregate of the preliminary probability density that the predicted preliminary probability density function associates with one or more other regions bordering said first region becomes larger.

In this way an underestimation of probability density in said first region is corrected that may arise when the predicted preliminary probability density is computed from vehicle dynamics without accounting for driver corrections or road construction.

The corrected probability density function may be used to generate collision warning signals or trigger an intervention in driving control. The collision avoidance system may compute the probability density function for the vehicle to which the warning signals or the intervention are applied, and/or for another vehicle that presents a danger of collision to the vehicle to which the warning signals or the intervention are applied.

Thus for example, an explicitly or implicitly computed aggregate or aggregates of the predicted probability densities for a future time point outside the road part for driving in the same direction as the vehicle may be used to determine a correction factor for the predicted probability densities for different positions inside that road part, so that the conditions for generating an alarm signal or intervention to avoid a collision with another road user in that road part are adjusted dependent on the aggregate. The correction factor may be made to increase as the aggregate outside the road part becomes larger. The aggregate that is used to control this correction may be an aggregate of predicted probability densities for all positions outside the road part, or an aggregate of positions to the left of the road part or an aggregate of positions to the right of the road part for example, or a combination of such aggregates may be used.

In an embodiment a first region, second and third region defined by the map data are used. The first region comprises a portion of the road for driving in the direction of travel of the vehicle and the second and third regions border on (i.e. lie adjacent to) the first region on mutually opposite sides along the direction of travel, comprising a road portion for driving opposite said driving direction of travel and an off road area bordering on the road. In this embodiment is the correction factor is increased more strongly in response to the aggregate preliminary probability density associated with the off road region than to the aggregate preliminary probability density of said third region than in response to the aggregate preliminary probability density of the opposite direction driving region. In this way account is taken of the fact that a driver is more likely drive temporarily on a road portion for traffic from the opposite direction than off the road.

In an embodiment the correction factor F is computed according to the formula $F=(1-C_2 \cdot P_2)/P_1$, wherein P1 and P2 are the aggregate of the preliminary probability densities associated with the region with the road portion for traffic in the direction of travel of the vehicle, and the region with the road portion for traffic in the opposite direction respectively, and wherein C2 is a coefficient less than one and above zero. The fact that the coefficient C2 is above zero has the effect that the correction factor F rises less strongly when probability is detracted from the first region to the region for opposite traffic than when probability is detracted from the first region to an off-road region.

In an embodiment the correction factor F is computed according to the formula $F=(1-C_2 \cdot P_2-C_3 \cdot P_3)/P_1$, wherein P3 is an aggregate of the preliminary probability density associated with the off-road region C3 being a coefficient between zero and C2. The fact that the coefficient C2 lies above C3 has the effect that the correction factor F rises less strongly when probability is detracted from the first region to the region for opposite traffic than when probability is detracted from the first region to an off-road region.

BRIEF DESCRIPTION OF THE DRAWING

These and other objects and advantageous aspects will become apparent from a description of exemplary embodiments by reference to the following figures.

DETAILED DESCRIPTION OF EXEMPLARY EMBODIMENTS

A collision avoidance system may be implemented entirely on board a vehicle or it may have components outside a vehicle. Thus, for example, supply of information about roadside object or other vehicles, computation of probability densities etc. may be performed by road-side equipment instead of in a vehicle. By way of example, an implementation inside a vehicle will be described.

Figure 1:
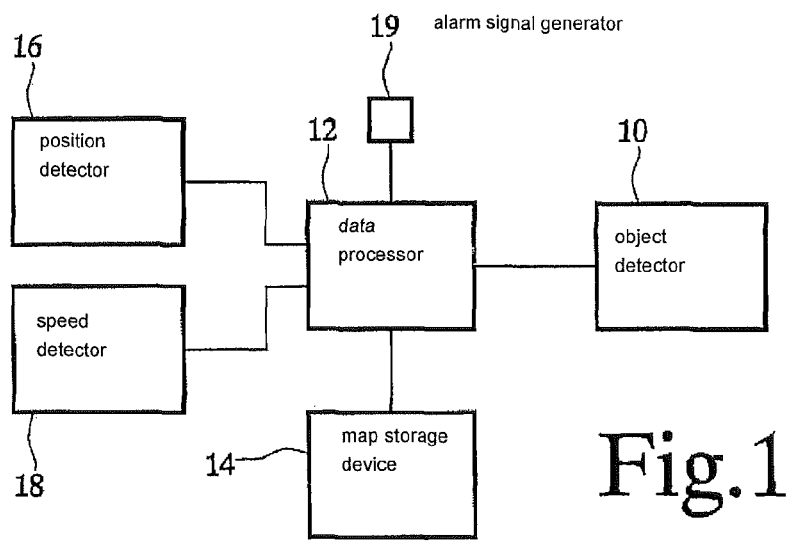
FIG. 1 shows a collision avoidance system

FIG. 1 shows an embodiment of a collision avoidance system in a vehicle, such as a motor car, comprising an object detector 10, a data processor 12, a map storage device 14, a position detector 16, a speed detector 18 and an alarm signal generator 19. Data processor 12 is coupled to object detector 10 map storage device 14, position detector 16, a speed detector 18 and alarm signal generator 19.

Object detector 10 may be configured to detect position and velocity of other vehicles, as well as to determine a type classification of each other vehicle. Object detector 10 may be a radar device for example, which may determine position from radar wave travel time and/or wave direction, velocity from Doppler shift and a classification from reflection amplitude. Alternatively, object detector 10 may comprise a transceiver for obtaining signals from transponders in other vehicles.

Position detector 16 may be a GPS unit with a GPS receiver and a GPS processor. The GPS processor may be part of data processor 12. Speed detector 18 may comprise wheel sensors mounted to sense the speed of revolution of the wheels of the vehicle and a heading detector. Alternatively speed detector 18 may be partly or wholly implemented using the GPS unit to measure speed.

Figure 2:
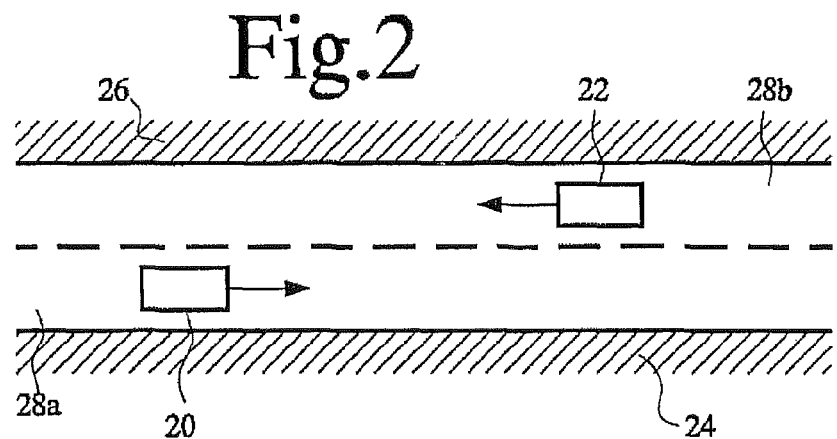
FIG. 2 shows an example of the geometry of a road

FIG. 2 shows an example of the geometry of a road with the vehicle 20 in which collision avoidance system is mounted. By way of example another vehicle 22 is shown as well. Off road areas 24, 26 to the left and right of the road and portions 28a,b of the road for traffic travelling in mutually opposite directions are indicated. Arrows indicate the driving direction of vehicles 20, 22. As used herein the term "road" may refer to a section of a longer road, from which the longer road continues onward or backward.

In operation data processor 12 may maintain information representing a probability density function $p_o(r;t)$ that defines probabilities that vehicle 20 will be in regions at different positions "r" on the road at a future time "t". The position r may be represented by two dimensional coordinates x, y on the road surface for example. Data processor 12 maintains further information representing one or more further probability density function $p_i(r;t)$ for the other vehicle 22, and optionally further vehicles (not shown). In one embodiment, the information may represent each probability density function by means of a respective set of values of the probability density functions sampled at a mesh of points on the road, or probabilities for position ranges associated with these points.

In another embodiment a piecewise representation may be used, wherein the information may represent a probability density function for a piece of the space of positions by means of parameters of a predetermined distribution function for that piece, such as a normal distribution function $N(r)=A \cdot \exp(-(r-r_o) \cdot C \cdot (r-r_o)/2)$. Herein $r_o$ is a modal position value, C is an inverse covariance matrix and A is a normalisation factor.

Methods of computing the values of the information that represents a probability density function based on vehicle dynamics are known per se. A known approach is to provide a motion specification for a vector "S" of state values of the vehicle 20. The vector includes the position r of the vehicle plus other components such as its orientation phi, its velocity "v", and one or more temporal derivatives of these values. Given an exact value of the state vector S at the current time, the motion specification makes it possible to predict the state vector S(t) for all future time.

In an embodiment wherein a probability density function is computed, an initial probability density of the state vector S at the current time is defined. The initial probability density may give exact values only for some components of the state vector S, such as the position r of the vehicle, while defining a distribution of possible values for other components such as accelerations. In this embodiment, the probability distribution for a future time follows from an aggregate of the predicted state vectors obtained by starting from different state vectors according to the initial probability density.

Motion Modelling

The motion specification defines future states to which different states will evolve with the lapse of time. The motion may be specified in terms of differential equations, or a table of respective future state values may be provided for given starting state value for a selected time increment.

A deterministic motion specification may be used. In one example, the motion specification relates the rate of change of each component of the vector to one or more other components that represent derivatives, the rate of change of the components that represent the highest order derivatives being set to zero. Instead a non-deterministic motion specification may be used, wherein the change of state values is modelled to vary according to some at least partially random function with a random parameter according predetermined probability distribution. In this case initial state components like the highest order derivatives may omitted. Invariance of the dynamics, such as invariance of the motion specification for position offset or fixed rotation, may be used to define future state values for a set of state vector values by means of one table entry.

The number of components of the state vector may be selected according to the effects that one wants to model, as expressed by the motion specification. In one example a state vector may be used with components (x, y, v, phi) and a motion specification specified by means of differential equations.

$$dx/dt=v*\cos(phi), dy/dt=v*\sin(phi),$$

$$dv/dt=0, dphi/dt=0$$

In this model the velocity (v) and heading (phi) are taken to be constant, but their values may be kept uncertain, described only by an initial probability density for the velocity and the heading. Optionally the parameters of these initial probability densities may depend on sensor input data. In contrast the values of x and y, the coordinates of the position of the vehicle on the road, may be taken to have definite initial values, but alternatively an initial probability distribution according to measurement uncertainty may be used for these as well. In another example a state vector may be used with components (x, y, v, phi, a, k), with equations of motion specified by means of differential equations $$dx/dt=v*\cos(phi), dy/dt=v*\sin(phi),$$

$$dv/dt=a\ dphi/dt=k*v$$

$$da/dt=0$$

$$dk/dt=0$$

In this example no definite values need not be defined for "a" and "k" for example, only an initial probability density being defined for the value of these parameters. The values of x, y, v, phi may be taken to have definite initial values, or to be described by initial probability distributions. It should be appreciated that these are only examples of models. Other models, with different state vectors and/or different equations of motion may be used, dependent on the accuracy that is pursued.

Initial Computation of the Probability Density

For simple equations of motion it may be possible to provide analytical expressions for the parameters of the probability density function for future times. For example, in the case of the first example with state vector (x, y, v, phi), the probability density for x and y has a modal value and variance that grow proportionally to a product of time and a modal value and variance of the distribution defined by v and phi.

Instead of by means of analytical expressions, information representing the probability density function for future times can be obtained by means of a Monte Carlo method. This may be done for example by randomly selecting a set of initial state vectors with a distribution according to the initial probability density, computing the state vectors for the future time for each of these initial state vectors and estimating parameters of the probability density function for the future time from the computed state vectors. Similarly, a systematic sampling of the space of initial state vectors may be used to estimate the density of future state vectors as a function of state vector values. Alternatively, an iterative computation may be used, wherein probability density distributions for successive time points are each computed from the probability density distributions for a preceding time point, the motion specification defining a mapping of state vector values from one time point to the next. The Monte Carlo approach can be used also when a non-deterministic motion specification is used.

In each case, the determination of the probability density function comprises gathering sensor data about components of the initial state vector. From this sensor data the initial probability is determined and from the initial probability density the information that represents the probability density function for a future time is computed.

Figure 3:
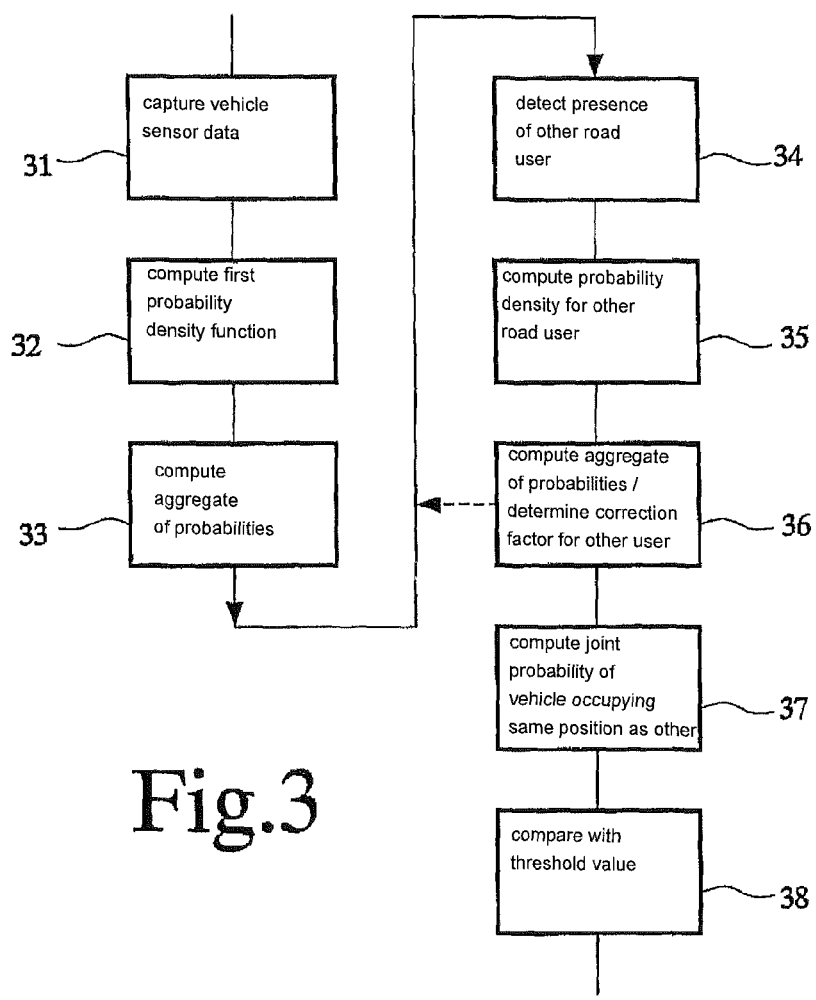
FIG. 3 shows a flowchart of collision avoidance

FIG. 3 shows a flowchart of an embodiment of a method of collision avoidance. In a first step 31, data processor 12 captures vehicle sensor data from position detector 16 and speed detector 18. Data processor 12 determines the direction of travel of the vehicle, from the heading of the vehicle, and/or from a history of changes of the detected position. In a second step 32, data processor 12 computes a first probability density function for a future time point "t" from an initial probability density and/or initial values that are determined from the vehicle sensor data. This computation may be performed in a way that is known per se, for example by a Monte Carlo method or by means of analytical expressions for the parameters of the probability density function.

Correction Using Map Data

In third step 33, data processor 12 first computes an aggregate of probabilities defined by the first probability density function for a set of positions defined by map data from map storage device 14. In an embodiment, the map data defines portions of the road that are implicitly or explicitly associated with directions of vehicle travel. When the width of the road is divided into two portions, the rightmost portion seen in a direction of travel may be implicitly associated with travel in that direction and the leftmost portion with travel in the opposite direction. This applies to a mode of operation for countries were vehicles drive on the right. In other countries a mode of operation may be used wherein the roles and left and right are exchanged.

In third step 33, data processor 12 uses the detected direction of travel to select the portion of the road that is associated with the direction of travel. Data processor 12 computes an aggregate probability P1 from the initial probability density computed in second step 32, aggregated over the set of positions that are on the portion of the road associated with the direction in which the vehicle is driving, a similar aggregate probability PL for the set of positions for the opposite direction of travel and an aggregate probability PR the set of positions that are outside the road respectively. The sets of positions may be selected so that they cover all possible positions, in which case the sum of these aggregates of probabilities should equal one. If so, the aggregates of probabilities may need to be computed directly only for two of these sets.

In an embodiment wherein only P1 and a quantity that is a sum PL+PR are used, in which embodiment only one aggregated may need to be computed. In another embodiment PL may be computed as an aggregate for the set of positions on a first side of the portion associated with the direction in which the vehicle is driving, the first side including the portion for opposite travel. In this embodiment PR may be computed as an aggregate for a set of positions on a second side of the portion opposite the first side.

Subsequently in third step 33, data processor 12 determines a correction factor F for application to a part of the first probability density function that applies to the portion of the road associated with the direction in which the vehicle is driving. In an embodiment, the correction factor F is computed according to $$F=(1-CL*PL)/P1$$

More generally the correction factor F may be computed according to $$F=(1-CL*PL-CR*PR)/P1$$

Herein CL and CR are normalization factors that are smaller than one and that effectively reduce the part of the probability density that applies to positions to the left and right of the part of the road for the direction in which the vehicle is driving. In the formula F=(1−CL*PL)/P1, CR is set to zero. CL may be set to 0.3 for example. A corresponding correction factor F' may be determined for the part of the probability density function to the left of the part of the road for the direction in which the vehicle is driving, according to F'=CL.

Application to Computation of Collision Probability

The correction factor F, or the correction factors F, F' will be used to compute a collision probability. By way of example, the computation of probability of collision with another road user, such as vehicle 22 will be described. But it should be appreciated that alternatively probabilities of collisions with fixed objects or moving objects other than vehicles may be computed.

In a fourth step 34, data processor 12 reads data from object detector 10 to detect whether another road user, such as vehicle 22 is present on the road, or at least present within a predetermined distance from object detector 10. If so, data processor 12 determines state parameters for the other road user, such as object position and speed from the detector signal. When object detector 10 is a radar unit for example, object position follows from the direction from which a reflection is received and the delay with which it is received. The speed in the direction of object detector 10 may be determined from Doppler shift. When the other road user is equipped with a transponder and the collision avoidance system has a transceiver for obtaining transponder data, the transponder data may provide such information.

In a fifth and sixth step 35, 36, data processor 12 performs similar computations as in second and third step 32, 33 for the detected other road user. However, the state vector and motion specification used in fifth and sixth step 35, 36, may differ from those used in second and third step 32, 33, dependent on a difference in the type of sensor data that is available for the vehicle 20 with the collision avoidance system and for the other road user. A probability density function and a correction factor Fi are computed for the other road user at the future time point "t". Optionally a correction factor Fi' for the part of the probability density function to the left of the part of the road for the direction in which the other vehicle is driving.

Fourth, fifth and sixth step 34, 35, 36 may be repeated for different road users, to determine a probability density function and a correction factor Fi for each other road users. Usually probability density functions for only a small number of vehicles may be used, for example one for the closest approaching vehicle from an opposite direction and one for a closest vehicle in front in the same direction. Although the embodiment has been described for vehicles, it should be appreciated that fourth step 34 and following steps could be applied to other road users in general, including pedestrians.

After sixth step 36, or after the repetitions of fourth to sixth step 34-36 data processor 12 executes a seventh step 37 wherein it computes a joint probability that the vehicle with the collision avoidance system occupies a same position as another vehicle at the future time point "t". For this purpose, a product of the correction factors F and Fi' or Fi (dependent on the driving direction of the other vehicle) and probabilities for the vehicle 20 and the other vehicle 22 are computed for one or more collision areas in the part of the road for the direction in which the vehicle 20 is driving. These probabilities may be computed as approximations of integrals of the probability densities of the vehicle and the other vehicle over the collision area. A similar product may be computed from the correction factors F' and Fi or Fi (dependent on the driving direction of the other vehicle) and probabilities for the vehicle 20 and the other vehicle 22 in the part of the road for the direction opposite to that in which the vehicle 20 is driving.

Response to the Computed Collision Probability

In eight step 38 data processor 12 compares the product from seventh step 37 for the future time point, or a sum of products for different collision areas with a threshold value, and executes a collision avoidance action dependent on a result of the comparison. The collision avoidance action may comprise triggering alarm signal generator 19 to render an alarm signal in the vehicle 20, for example a sound signal on a loudspeaker (not shown) in alarm signal generator 19, or an active intervention such as activating a brake (not shown), controlling a drive unit (not shown) to reduce drive power (e.g. by controlling supply of gas or electricity) or controlling a steering unit to adjust vehicle steering. The action may be adapted dependent on the location of the collision area for which the product exceeds the threshold, using breaking for example if the area is in the vehicles lane for the direction in which the vehicle is driving and steering otherwise. Different collision avoidance actions may be taken dependent on comparisons with different thresholds.

Although an example of seventh and eight step 37, 38 has been described wherein the factors are applied to the probabilities and a predetermined threshold are used, it should be appreciated that alternatively the threshold may be adapted in inverse proportion to the factors. Whatever combination is used, the decision depends on a value of a ratio between the threshold and a product of the probabilities and the factors.

Optionally, second to eight step 32-38 may be repeated for a number of different future time points, for example for increasingly distant future time points up to a predetermined maximum time distance, until it has been found that the collision probabilities are below the thresholds for all time points, or until a decision to take a collision avoidance action has been taken. The threshold values and the actions for different time points may be different.

Information Used for Computing the Probability Density

In an embodiment the map data may be supplied to the collision avoidance system from road-side stations. In this embodiment the collision avoidance system may comprise a receiver to receive such data. In an embodiment the map data may be derived from a pre-stored database about a road network, such as is used for route planning for example. In this case, position detector 16 is used to determine the position R1 of the vehicle 20 relative to the defined roads road network and the definition of coordinates Re-R1 of road edge and the separation between road parts for different directions relative to the vehicle may be obtained from road edge coordinates Re.

In an alternative embodiment object detector 10 may be used to determine the map data at run time. When a radar unit is used for example detected reflections from a row of stationary objects (objects that move with the same speed as the measured speed of the vehicle, but in opposite direction) such as a crash barrier, parked cars or lanterns may be used to identify an edge of the road, optionally in combination with a database about a road network that relates the positions of such objects to the position of the road edge and separation between the parts of the road for different driving directions. A dynamically determined road map with such an identified edge and separation may subsequently be used in third and sixth step 33, 36 to determine the correction factors. In this case position detector 16 may not be needed.

Additional sensors or other sensors may be used to increase the accuracy of the initial state vector and/or initial probability densities. Thus for example the collision avoidance system may comprise an orientation sensor or an acceleration sensor.

Data processor 12 may be configured to deactivate use of the correction factors F, Fi when the map data indicates that the position of the collision area is located a road crossing or on a one way road. Although an embodiment has been described wherein the factors F, Fi are applied after computing probabilities for collision areas, it should be appreciated that instead the factors may be applied to the representation of the probability density function.

It should be appreciated that only one possible embodiment of the computation of the correction factors in third and sixth step 33, 36, has been shown. The correction factor is used to reduce the effect of inaccuracy of the model represented by the states and the motion specification. Such a model has only limited possibility to account for driver behaviour. Obviously, at a time scale of minutes driver behaviour entirely overrides the predictability of the position on the road that would follow from purely mechanical equations of motion. On a much shorter time scale, in which the driver is not expected to make any changes collision avoidance can be performed without modelling driver behaviour.

However, it is desirable to extend the time scale at which collision avoidance is effective to a time scale at which changes made by the driver occur that have a significant effect. This presents a problem as a purely mechanical model is insufficient. On the other hand an assumption of totally random driver behaviour can lead to many false alarms. Hence another way is needed to account for reasonable driver behaviour.

The correction factors in third and sixth step 33, 36 provide for an approximate way of accounting for reasonable driver behaviour. A reasonable driver cannot avoid that a vehicle swerves somewhat on the road, but the driver will almost unknowingly correct for extreme swerving that would cause the vehicle to end up outside the road or in the lane for traffic from the opposite direction. Without a correction for this behaviour, a longer time scale computation will structurally underestimate the probability densities for positions on the road in the right driving direction. The correction factors in third and sixth step 33, 36 correct for this by effectively raising the right direction part probability density function that is used for collision avoidance, dependent on the aggregate probability densities computed for off-lane positions. The latter are taken as a measure for the effect of failure to account for swerving corrections.

It should be appreciated that it is not indispensible to account for this effect in an exact way. Any correction that accounts at least partly for this effect improves the reliability of collision avoidance. But of course further improvement of reliability of collision avoidance can be realized by using better corrections for failure to account for swerving corrections.

In a simple embodiment the correction factor F could be computed under the assumption that all probability density outside the part of the road for the driving direction of the vehicle 20 is due to failure to account for swerving corrections. In this embodiment the correction factor would be $$F=1/P1$$

However, when avoidance of head on collisions is an issue, this may lead to failure to detect potential collisions. In another embodiment this can be improved by imposing an assumption that there is a probability that the vehicle does swerve out of its lane. This is accounted for by the use of $$F=(1-CL*PL)/P1$$

Herein CL lies between zero and one, to account for errors due to failure to account for swerving corrections. CL=0.3 may be used for example, but for example, other values from the range of 0.1 to 0.5 may also provide for improved performance.

In an embodiment, different values of the factor CL may be used to probability densities function that apply for different times in the future, taking a larger value for a smaller time in the future and a smaller value for a time further in the future. For example a factor CL=1 may be used up to 0.2 second in the future, knowing that a driver will not respond so quickly and a factor of CL=0.3 may be used for larger times in the future. Successively smaller values of the factor CL may be used for successively further times in the future, gradually reducing from one to 0.3 for example.

In another embodiment, a maximum may be imposed on the probability PL. In this case CL is effectively made equal to one when PL is smaller than a threshold T and CL is set to CL=T/PL otherwise. In this case correction for the effect of failure to account for swerving corrections is triggered only when a large amount of potential error is detected. In this case a function CL=g(PL) is effectively used, with g(x)=1 for x<T and g(x)=T/x for x>T. Other functions may be used instead, such as g(x)=1/(1+x/T)

In another embodiment, one may use a correction factor $$F=(1-CL*PL-CR*PR)/P1$$

with both CL and CR between zero and one. In this way account can be taken of the effect of a small probability of moving off the road to the right.

As will be appreciated, the computation may introduce an asymmetry between left and right, corresponding to the assumption that traffic will use the right part of the road, seen in the direction of travel. In countries where the traffic rule is to drive on the left, the roles of left and right should be exchanged. Data processor 12 may be configured to support a first and second mode, with mutually exchanged roles of left and right, for such different types driving rules. In an embodiment, map storage device 14 stores information linking position to driving on the left or right and data processor 12 is configured to use a detected position from position detector 16 to retrieve this information and to control switching to the first or second mode dependent on the retrieved information for the current position.

In an embodiment the probability density function may be computed iteratively, for each successive time in the future from a probability density function for a preceding time. In principle the correction factors may be applied at each iteration and used to compute the next iteration. But, the computation can be speeded up by computing the probability density functions for all times without such corrections first. This does not effect the result when a motion specification is used that provide for monotonically changing position values.

In an embodiment the components of the collision avoidance system are all mounted in the vehicle 20 for which the collision avoidance is provided. Alternatively, part of the components may be outside the vehicle, for example if a wireless communication channel between the vehicle and these components is provided. Thus for example object detector 10, data processor 12, map storage device 14, position sensor 16 and/or velocity sensor 18 may all be located outside the vehicle 10. A roadside object detector 10, position sensor 16 and/or velocity sensor 18 may be used in communication with an in-vehicle data processor 12, for example.

Data processor 12 may be implemented as a control circuit comprising a programmable processor and a program memory containing a program to make the programmable processor perform the actions described for data processor 12. Alternatively the a control circuit may comprise a plurality of programmable processors and one or more program memories for distributed programs to make a combination of programmable processors perform the actions described for data processor 12. In a further embodiment part or all of these processors may be implemented as dedicated circuits designed to perform these actions. As used herein, statements that data processor 12 is configured to perform these actions refer to each of these embodiments as alternative implementations.

In an embodiment the entire system may be implemented on board a vehicle. In other embodiments part or all of the system may be implemented elsewhere, for example in road side equipment. Thus for example road side equipment may be used that detects road users and computes probability density functions for each of the road users, computing and applying correction factors for at least part of the road users, for example for motor cars. For other type of road user, such as pedestrians or cyclists, other computations may be used to compute probability densities. As the speed of such road users is generally lower than that of motor cars, it may suffice to compute less accurate local probability densities for these road users.

In such a road side system case it may suffice to store a limited amount of map data for a road section for which the system is active. This map may be dynamically updated to account for road events, such as collisions, or for changing road conditions, such as rain or ice. The system may be provided with a transmitter to send warning signals to road users, dependent on collision probabilities computed from the probability density functions and the correction factors. Alternatively, or in addition, the system may be configured to control road-side devices, such as traffic lights or warning light dependent on collision probabilities computed from the probability density functions and the correction factors. In another embodiment, a mixed road side-in vehicle system may be used. Map data and/or information about other vehicles may be transmitted from a road-side part of the system to vehicles for example.

The invention claimed is:

1. A collision avoidance system for a vehicle, the system comprising
 a map storage device for storing road map data distinguishing a plurality of regions of an area that contains a road;
 a vehicle state detector, configured to detect at least a position part of a current state of the vehicle; and
 a data processor configured to use detected information about the current state of the vehicle to compute a probability density function of future positions of the vehicle in the area, and to compute a correction factor applicable to said probability density function for all positions in a first one of the regions, the data processor determining the correction factor dependent on aggregates of the probability density function in respective ones of the regions,
wherein the correction factor is configured to modify a distribution of probability density between the first and a second one of the regions by increasing the probability density in the first one of the regions and decreasing the probability density in the second one of the regions.

2. A collision avoidance system according to claim 1, wherein the first one of the regions comprises a portion of the road for traffic in a direction of travel of the vehicle, and the second one of the regions lies adjacent to the first region along the direction of travel.

3. A collision avoidance system according to claim 2, wherein the road map data stored in the storage device distinguishes the first one of the regions, the second one of the regions and a third one of the regions, the second one of the regions comprising a portion of the road for traffic travelling in a direction opposite to the direction of travel of the vehicle, and the third one of the regions comprising an area bordering on the road, the probability density function defining aggregates of probability density associated with the first, the second and the third one of the regions, and wherein the data processor is configured to increase the correction factor dependent on the aggregate of probability density associated with the third one of the regions and the aggregate of probability density associated with the second one of the regions.

4. A collision avoidance system according to claim 3, wherein the data processor is configured to compute the correction factor F according to the formula $F=(1-C2*P2-C3*P3)/P1$, wherein P1, P2 and P3 are the aggregates of the probability density associated with the first, the second and the third ones of the regions respectively, and wherein C2 and C3 are coefficients with values less than one and above zero, C3 being smaller than C2.

5. A collision avoidance system according to claim 2, wherein the data processor is configured to compute the correction factor F according to the formula $F=(1-C2*P2)/P1$, wherein P1 and P2 are the aggregates of the probability density associated with the first and the second ones of the regions respectively and wherein C2 is a coefficient with a value less than one and above zero.

6. A collision avoidance system according to claim 1, comprising an output device, the data processor being configured to trigger generation of an alarm signal by the output device upon detection that the corrected probability density function assigns more than a threshold amount of probability to colliding positions.

7. A collision avoidance system according to claim 6, comprising an object detector configured to detect another vehicle on the road, and wherein the data processor is configured to use a detected state of the other vehicle to compute a further probability density function of the other vehicle, and to compute a collision probability from overlap between the further probability density function and the probability density function, corrected according to the correction factor.

8. A collision avoidance system according to claim 1, comprising a steering controller and/or a speed controller, the data processor being configured to activate the steering controller and/or the speed controller upon detection that the corrected probability density function assigns more than a threshold amount of probability to colliding positions.

9. A collision avoidance system according to claim 1, wherein the road map data stored in said storage device distinguishes one way roads from two way roads and wherein the data processor configured to select said set dependent on whether the road map data indicates that the vehicle is in a one way road or a two way road.

10. A collision avoidance system according to claim 1, wherein the road map data stored in said storage device distinguishes first road sections at which the road has cross sections with other roads and second road sections without such cross sections and wherein the data processor configured to select said set dependent on whether the road map data indicates that the vehicle approaches one of the first road sections.

11. A method of collision avoidance for a vehicle on a road, the method comprising storing road map data distinguishing a plurality of regions in an area that contains the road;
detecting a state of the vehicle, comprising detecting at least a position of the vehicle relative to the road;
computing a probability density function of future positions of the vehicle; and
computing a correction factor applicable to the probability density function for all positions in a first one of the regions, dependent on aggregates of the probability density function in respective ones of the regions, wherein the correction factor is configured to modify a distribution of probability density between the first and a second one of the regions by increasing the probability density in the first one of the regions and decreasing the probability density in the second one of the regions.

12. A computer program product, comprising a non-transitory computer readable medium having a computer program embodied thereon, the computer program including instructions for a programmable processor that, when executed by the programmable processor, will cause the programmable processor to:

receive state information of a vehicle, comprising at least a position of the vehicle relative to a road;
compute a probability density function of future positions of the vehicle from the received state information;
retrieve road map data distinguishing a plurality of regions in an area containing the road; and
compute a correction factor applicable to the probability density function for all positions in a first one of the regions, dependent on aggregates of the probability density function in respective ones of the regions, wherein the correction factor is configured to modify a distribution of probability density between the first and a second one of the regions by increasing the probability density in the first one of the regions and decreasing the probability density in the second one of the regions.

* * * * *